United States Patent [19]

Kitamura et al.

[11] Patent Number: 5,479,552
[45] Date of Patent: Dec. 26, 1995

[54] WAVEGUIDE-TYPE OPTICAL DEVICE

[75] Inventors: Naoki Kitamura; Hiroshi Nishimoto, both of Tokyo, Japan

[73] Assignee: NEC Corporation, Tokyo, Japan

[21] Appl. No.: 294,302

[22] Filed: Aug. 23, 1994

[30] Foreign Application Priority Data

Aug. 27, 1993 [JP] Japan .................................. 5-212960

[51] Int. Cl.⁶ .................................................. G02B 6/12
[52] U.S. Cl. .............................. 385/132; 385/14; 385/16; 385/40; 385/41; 385/129; 385/130; 385/131
[58] Field of Search ................................. 385/1–10, 14, 385/16, 40, 41, 129, 130, 131, 132

[56] References Cited

U.S. PATENT DOCUMENTS

| | | | |
|---|---|---|---|
| 4,701,008 | 10/1987 | Richard et al. | 385/132 |
| 5,050,947 | 9/1991 | Kawashima et al. | 385/9 |
| 5,134,681 | 7/1992 | Ratovelomanana et al. | 385/130 |
| 5,148,507 | 9/1992 | Tanisawa | 385/41 |
| 5,185,830 | 2/1993 | Nishimoto | 385/41 |
| 5,214,724 | 5/1993 | Seino et al. | 385/2 |
| 5,303,315 | 4/1994 | Granestrand | 385/16 |
| 5,339,369 | 8/1994 | Hopfer et al. | 385/2 |
| 5,356,523 | 10/1994 | Vannucci et al. | 204/192.23 |
| 5,371,812 | 12/1994 | Nakamura | 385/9 |

FOREIGN PATENT DOCUMENTS

| | | | |
|---|---|---|---|
| 0315350 | 5/1989 | European Pat. Off. | 385/132 X |
| 2-272505 | 11/1990 | Japan | 385/132 X |
| 3-127022 | 5/1991 | Japan | 385/132 X |
| 6-075195 | 3/1994 | Japan | 385/132 X |

OTHER PUBLICATIONS

"DC Drift Phenomena in $LiNbO_3$ Optical Waveguide Devices", *Japanese Journal of Applied Physics*, vol. 20, No. 4, Apr. 1981, by Syoji Yamada et al., pp. 733–737.

*Primary Examiner*—Brian Healy
*Attorney, Agent, or Firm*—Young & Thompson

[57] ABSTRACT

In a waveguide-type optical device, two optical waveguides are formed in a substrate of $LiNbO_3$ or $LiTaO_3$. On the substrate and the two waveguides, a blocking layer is formed to block a diffusion of Li ions from the substrate. On the blocking layer, a buffer layer made from $SiO_2$ is formed. Each of the electrodes, from which operation voltages are supplied, covers each coupling part of the two optical waveguides, respectively, via the blocking layer and the buffer layer.

7 Claims, 2 Drawing Sheets

WAVEGUIDE-TYPE OPTICAL DEVICE

FIELD OF THE INVENTION

The invention relates to a waveguide-type optical device which performs amplitude modulation of an optical signal and switching of optical paths, and more particularly to a waveguide-type optical switch formed on a $LiNbO_3$ or $LiTaO_3$ substrate having an electro-optical effect.

BACKGROUND OF THE INVENTION

A conventional waveguide-type optical switch fabricated on a $LiNbO_3$ crystal substrate has the characteristics of low light absorption, low loss, and high efficiency due to its high electro-optical effect.

The conventional waveguide-type optical switch is disclosed, for example, in Shoji Yamada et al., "DC Drift Phenomena in $LiNbO_3$ Optical Waveguide Devices", *Japanese Journal of Applied Physics*, Vol. 20, No. 4, April 1981, pp. 733–737.

Referring to FIGS. 1A and 1B, the conventional waveguide-type optical switch is described. FIG. 1A is a perspective view of the conventional waveguide-type optical switch structure and FIG. 1B is a sectional view of the structure.

In the optical switch of FIGS. 1A and 1B, a buffer layer 3 is formed on a $LiNbO_3$, substrate 1, which includes two Ti-diffused optical waveguides 2a and 2b. Electrodes 4a and 4b of a metallic material are formed on a coupling portion 5 of each of the optical waveguides 2a and 2b via the buffer layer 3, respectively.

The buffer layer 3 prevents light propagating along the optical waveguides 2a and 2b from being absorbed by the electrodes 4a and 4b, etc. $SiO_2$ is used as the buffer layer 3 because its refraction index of 1.45,. which is smaller than the refractive index of about 2.2 of an $LiNbO_3$ or $LiTaO_3$ substrate and because $SiO_2$ exhibits low light absorption. When the buffer layer's refractive index is small as in the case of $SiO_2$, it is more feasible to reduce the thickness of the buffer layer 3 to prevent the absorption of light than in the case of a material having a large refractive index.

When switching voltages are applied to the electrodes 4a and 4b, an external electric field concentrates on the buffer layer 3 because the dielectric constant of the buffer layer is smaller than that of the substrate. Therefore, the electric field in the substrate is relatively small. The magnitude of the switching voltages needed for the switching and the modulation becomes higher for larger thicknesses of the buffer layer 3.

Since $SiO_2$ has a small refractive index and extremely low absorption of light, is no other material for the buffer layer 3 is superior to $SiO_2$.

However, when $SiO_2$ is used as the buffer layer 3 and a DC voltage is applied between electrodes 4a and 4b, Li ions, diffused from the substrate into the buffer layer 3 at the fabrication stage, are pulled by the electric field and collected under the electrodes 4a and 4b. Accordingly, an electric field which is counter to the external electric field is generated between the electrodes 4a and 4b. The magnitude of the counter electric field increases as the total moved amount of ions increases with time because $SiO_2$ has a high ion conductivity despite its relatively high electric insulating property. If the externally applied voltages are kept constant, the resultant electric field applied to the optical waveguides is reduced by the generation of the counter electric field, causing a deterioration of the device characteristics. This shift in an operating voltage point for the switching or modulating operation, known as DC drift becomes a problem when putting the device into practical use.

SUMMARY OF THE INVENTION

The object of the invention is to provide a waveguide-type optical device capable of stable operation over a long period of time.

According to the invention, there is provided a waveguide-type optical switching device comprising:

a substrate having an electro-optical effect;

first and second optical waveguides formed in the substrate;

a blocking layer formed on the substrate and the two optical waveguides;

a buffer layer, the refractive index of which is smaller than that of the substrate formed on the blocking layer, and first and second electrodes which cover a coupling part of each of the first and second optical waveguides, respectively, via the buffer layer and the blocking layer.

DETAILED DESCRIPTION OF THE PREFERRED EMBODIMENTS

Figure 2:
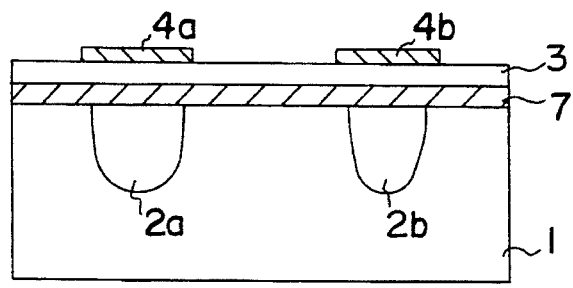
FIG. 2 shows a sectional view of the first embodiment of the invention.

Referring to FIG. 2, a first embodiment of the invention is hereinafter described. FIG. 2 shows a sectional view of the first embodiment. In the following description, the same reference numerals show the same elements with the same function.

Figure 1A:
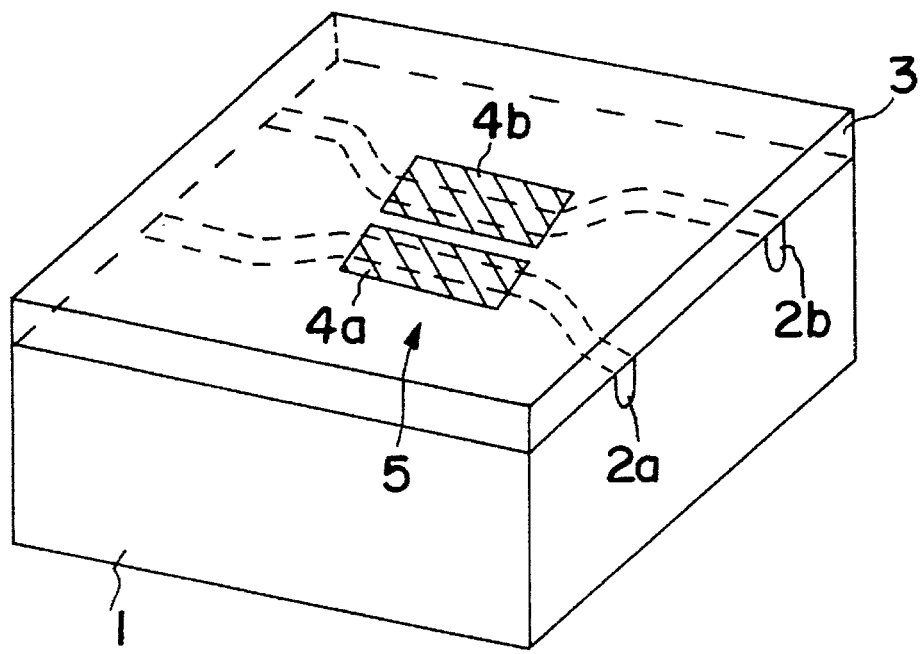
FIG. 1A shows a perspective view of the structure of a conventional waveguide-type optical switching device.
Figure 1B:
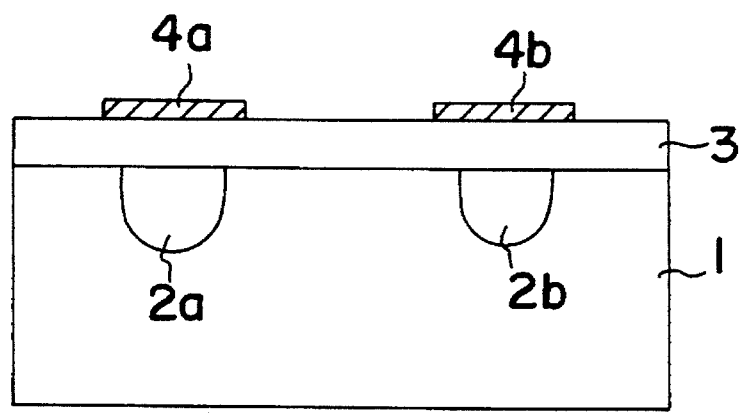
Figure 1B shows a sectional view of the conventional waveguide-type optical switching device.

As shown in FIG. 2, the first embodiment comprises:

an $LiNbO_3$ or $LiTaO_3$ substrate 1 including two optical waveguides 2a and 2b;

a Li ion blocking layer 7 which is formed on the substrate 1 including the two optical guides and which blocks mixing by diffusion of Li ions from the substrate 1;

a buffer layer 3, which is the same layer as the buffer layer 3 of FIGS. 1A and 1B; and two electrodes 4a and 4b each formed over the two waveguides 2a and 2b respectively via the blocking layer 7 and the buffer layer 3.

As is clear from a comparison of FIGS. 1A and 1B with FIG. 2, the first embodiment features a blocking layer 7.

For the materials to be used as the blocking layer 7 formed between the substrate 1 and the buffer layer 3, there is imposed a condition that the Li ion diffusion rate within it is smaller than in the buffer layer 3. Suitable materials for the blocking layer 7 include Si, $Si_3N_4$, SiON, and $MgF_2$.

With such structure, even when a heat treatment is applied during the formation of the buffer layer 3, Li ions diffused from the substrate 1 are blocked by the blocking layer 7 and cannot reach the buffer layer 3. By adopting the structure, DC drift caused by the formation of the counter-electric field due to ion migration can be reduced. In addition, the electric field strength in the substrate 1 at the time of application of voltages to the electrodes 4a and 4b is hardly affected by making the thickness of the Li ion diffusion blocking layer 7 small, so that it is possible to suppress the rise of operating or switching voltage to the electrodes 4a and 4b.

Figure 3:
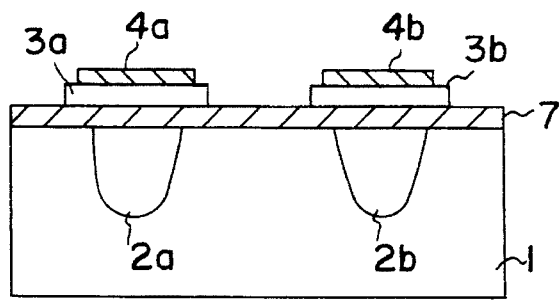
FIG. 3 shows a sectional view of the second embodiment of the invention.

Next, referring to FIG. 3, a second embodiment is explained. As shown in FIG. 3, in the second embodiment, the buffer layer 3 of the first embodiment is divided into a first buffer layer 3a and a second buffer layer 3b, which cover the optical waveguides 2a and 2b, respectively via the blocking layer 7. In other words, the buffer layer 3 of the first embodiment is eliminated in a region between the electrodes 4a and 4b.

By adopting the second embodiment, migration of ions diffused through the buffer layer is avoided and DC drift suppression effect increases relative to the first embodiment of FIG. 2.

Figure 4:
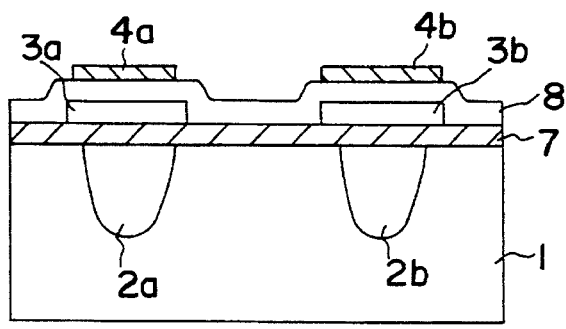
FIG. 4 shows a sectional view of the third embodiment of the invention.

Referring to FIG. 4, a third embodiment of the invention is described. As shown in FIG. 4, in the third embodiment, a phosphosilicate glass (PSG) film 8 is provided on the entire surface of the first and second buffer layers 3a and 3b and on the substrate where the first and second buffer layers are absent.

Since the PSG film has the effect of gettering Na ions, it can suppress the migration of the Na ions in the buffer layers 3a and 3b.

The remaining structure of the third embodiment is the same as the structure of the second embodiment. Therefore, the third embodiment has the effect of suppressing the Na ion migration in addition to suppressing the Li ion migration.

Figure 5:
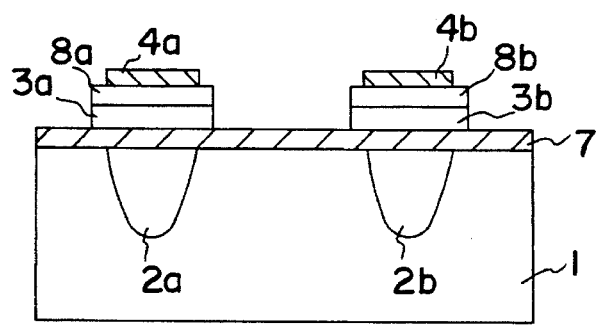
FIG. 5 shows a sectional view of the fourth embodiment of the invention.

Next, referring to FIG. 5, a fourth embodiment of the invention is described. The only difference between the fourth embodiment of FIG. 5 and the third embodiment of FIG. 4 lies in that the PSG film 8 is eliminated in a region between the electrodes 4a and 4b. The separation of the PSG film 8 into a first and second PSG film 8a and 8b eliminates the ion migrations in itself and suppresses the DC drift due to the migrations more effectively than the previous three embodiments.

As described above, the present invention reduces the DC drift of waveguide type optical devices. The invention is effective not only for optical devices constituted of a directional coupler as in the embodiments described above, but also for all waveguide-type optical devices including the Mach-Zender type and the total reflection type using crossed waveguides.

We claim:
1. A waveguide-type optical device comprising:
   a substrate of electrooptical material;
   first and second optical waveguides formed in the substrate;
   a substrate ion blocking layer formed on said substrate and said first and second optical waveguides;
   a buffer layer, a refractive index of which is smaller than that of said substrate, formed on said blocking layer; and
   first and second electrodes which cover a coupling part of each of said first and second optical waveguides respectively via said buffer layer and said blocking layer.

2. The waveguide-type optical device as claimed in claim 1, wherein said substrate is made from a material selected from the group consisting of $LiNbO_3$ and $LiTaO_3$.

3. The waveguide-type optical device as claimed in claim 1, wherein said blocking layer is made from a material selected from the group consisting of Si, $Si_3N_4$, SiON and $MgF_2$.

4. The waveguide-type optical device as claimed in claim 1, wherein said buffer layer is made of $SiO_2$.

5. The waveguide-type optical device as claimed in claim 1, wherein said buffer layer is separated into a first buffer layer and a second buffer layer;
   said buffer layer is absent between said first and second electrodes;
   said first and second buffer layers cover said first and second optical waveguides, respectively, via said blocking layer; and
   said first and second electrodes are formed on said first and second buffer layer, respectively.

6. The waveguide-type optical device as claimed in claim 5, wherein said device further comprises a phosphosilicate glass (PSG) film, which covers said first buffer layer, said second buffer layer and said blocking layer,
   said first electrode covers said first optical waveguide via said PSG film, said first buffer layer and said blocking layer; and
   said second electrode covers said second optical waveguide via said PSG film, said second buffer layer and said blocking layer.

7. The waveguide-type optical device as claimed in claim 6, wherein said PSG film comprises a first PSG film portion and a second PSG film portion;
   said PSG film is absent between said first and second electrodes;
   said first electrode covers said first optical waveguide via said first PSG film portion, said first buffer layer and said blocking layer; and
   said second electrode covers said second optical waveguide via said second PSG film portion said second buffer layer and said blocking layer.

* * * * *